March 13, 1956
C. J. HOLLAND ET AL
2,737,905
TRUCK BOLSTER DAMPING DEVICE
Filed March 18, 1950
3 Sheets-Sheet 1
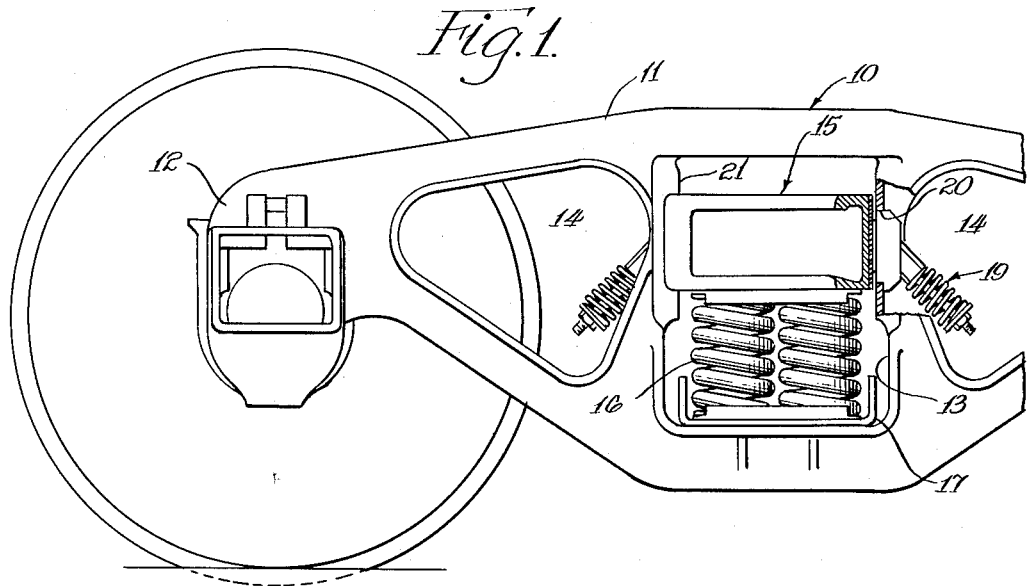
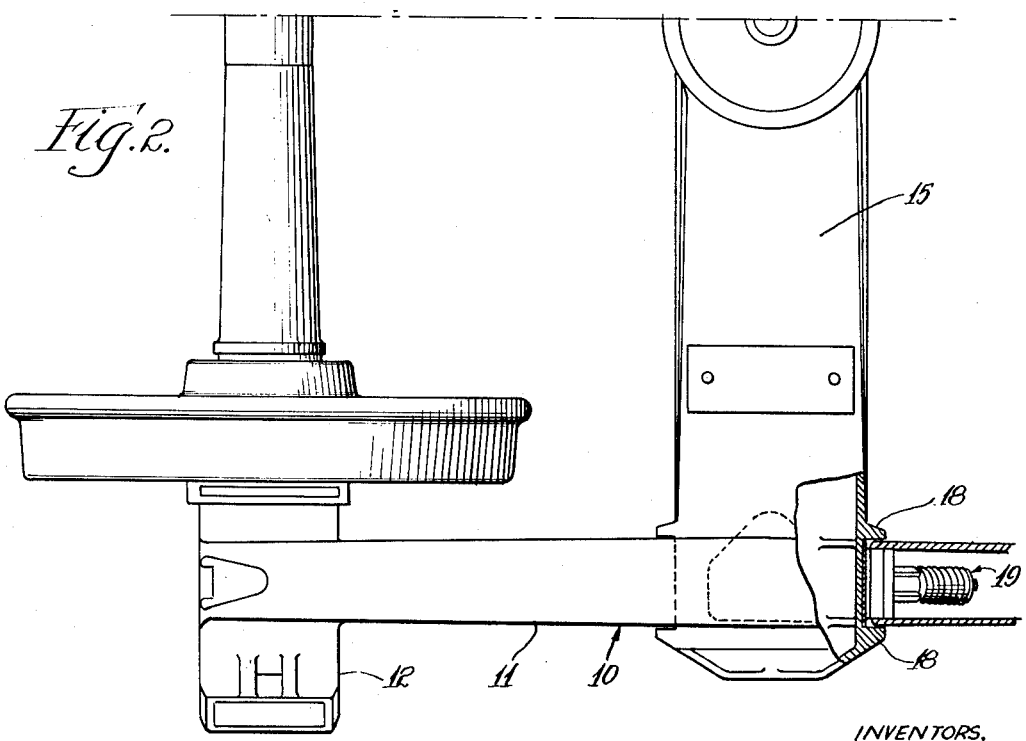
INVENTORS.
Cyrus J. Holland,
Cal W Wulff,
By Arthur H. Carlson
Mann and Brown
Attys.

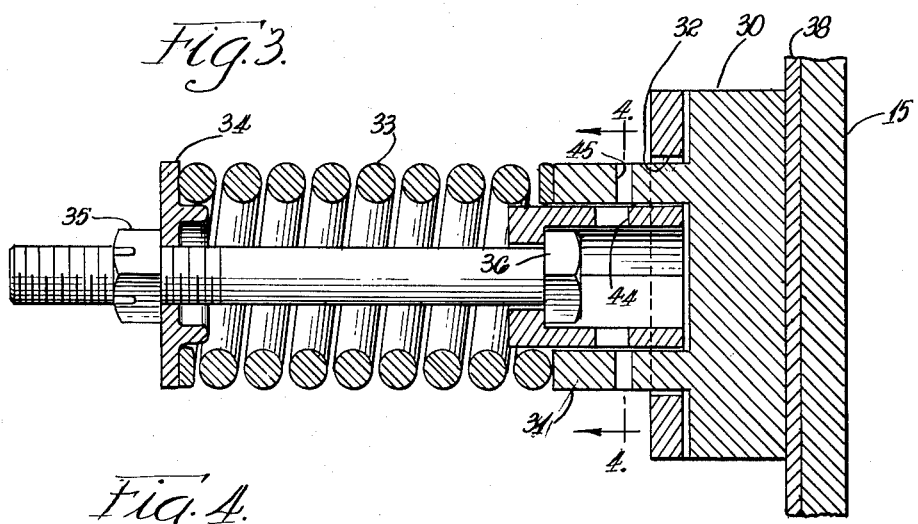
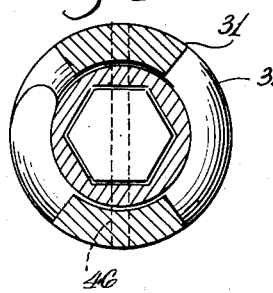
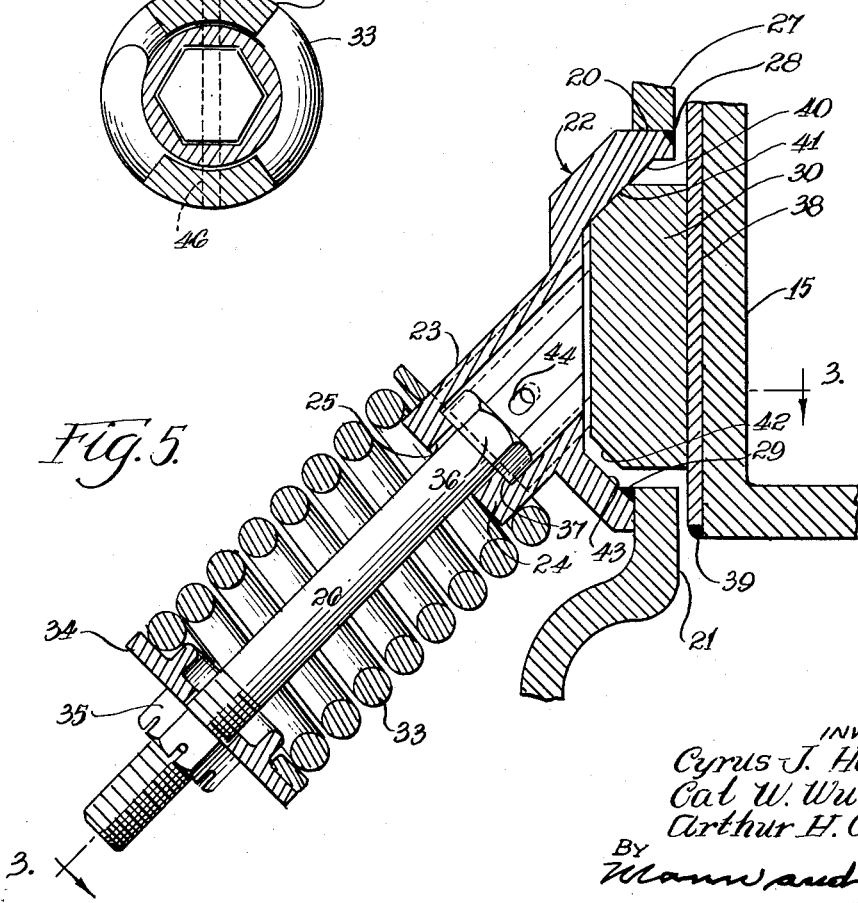

March 13, 1956  C. J. HOLLAND ET AL  2,737,905
TRUCK BOLSTER DAMPING DEVICE
Filed March 18, 1950  3 Sheets-Sheet 3
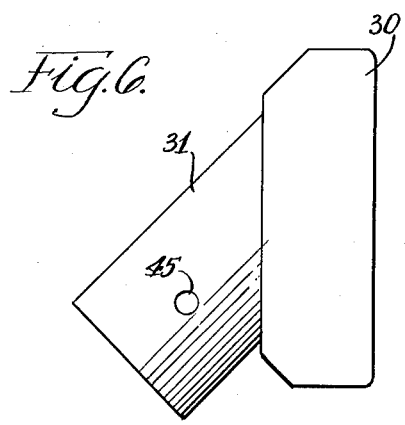
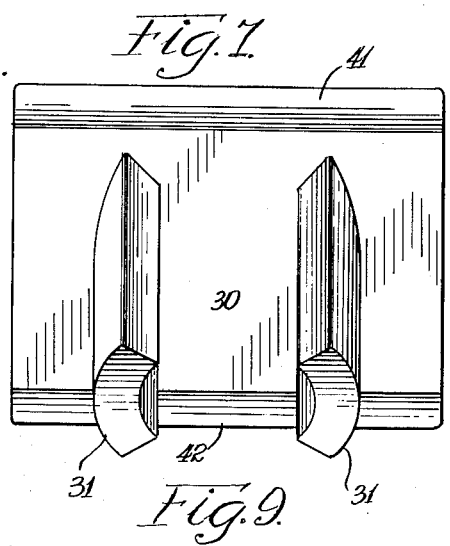
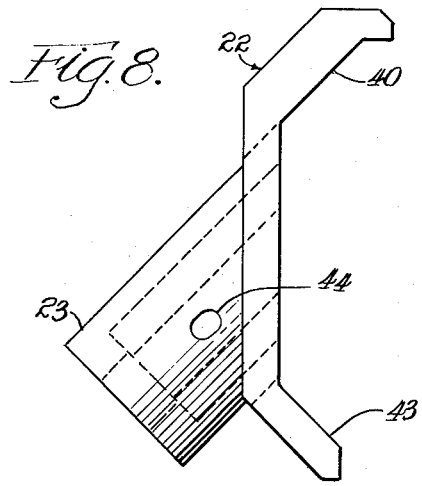
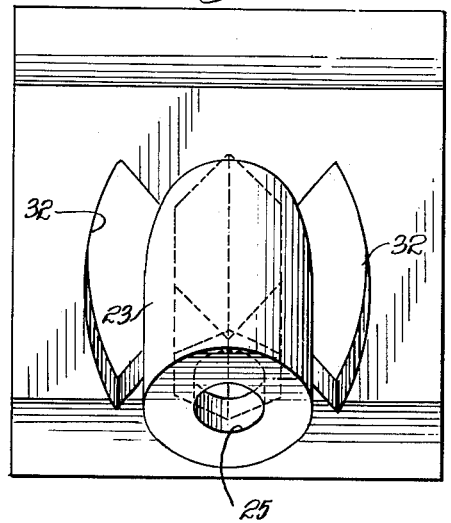
INVENTORS.
Cyrus J. Holland,
Cal W. Wulff,
Arthur H. Carlson
BY Mann and Brown
Attys.

United States Patent Office 2,737,905
Patented Mar. 13, 1956

2,737,905

TRUCK BOLSTER DAMPING DEVICE

Cyrus J. Holland, Cal W. Wulff, and Arthur H. Carlson, Chicago, Ill., assignors to Holland Company, a corporation of Illinois Application March 18, 1950, Serial No. 150,374

3 Claims. (Cl. 105—197)

This invention relates to a damping device for railway car trucks of the type having a bolster extending through bolster openings in the truck side frames, and supported at each end within these bolster openings by a group of bolster springs. The invention is particularly suitable for use with conventional freight car trucks of this type which, when built, were not provided with, nor intended to be provided with, a damping device located between the bolster and the side frame columns, flanking the bolster openings.

The importance of using built-in damping devices in freight car trucks is rapidly becoming apparent, and practically all new car trucks are now equipped with some such device. However, there is a need for a simple, yet rugged and effective, device which can readily be applied to existing car trucks, and it is the principal object of this invention to supply that need.

Further and other objects and advantages will become apparent as the disclosure proceeds and the description is read in conjunction with the accompanying drawings, in which:

Fig. 1 is a fragmentary side elevational view of a conventional freight car truck equipped with the damping device of this invention;

Fig. 2 is a plan view of the same;

Fig. 3 is a sectional view of the damping device taken on the line 3—3 of Fig. 5;

Fig. 4 is a transverse sectional view taken on the line 4—4 of Fig. 3;

Fig. 5 is a vertical sectional view of the device;

Figs. 6 and 7 are side elevational and plan views, respectively, of the friction shoe with its wing projection; and Figs. 8 and 9 are side elevational and plan views, respectively, of the housing for the friction shoe.

A preferred form of the invention has been illustrated in the drawings and will hereinafter be described pursuant to the requirements of Section 4888 of the Revised Statutes, but it will be understood that the invention may be variously embodied within the scope of the appended claims.

The invention has been shown applied to a conventional freight car truck 10 of the spring plank type (it may be applied to a spring plankless truck as well), and comprises a cast side frame 11 provided at its ends with journals 12 and having a bolster opening 13 and window openings 14. A truck bolster, generally designated 15, is mounted within the bolster opening 13 and is resiliently supported at each end by bolster springs 16 which rest upon spring seats carried on a spring plank 17. The bolster is guided in its vertical movement within the bolster opening 13 by flanges 18 which span the side frame as best shown in Fig. 2.

In order to obtain good riding qualities for the truck, it is necessary to dampen vertical movement of the bolster 15 within the bolster opening 13, and in new car trucks this is accomplished in a variety of ways. The present invention provides a simple yet effective means for applying a damping device to existing railway car trucks so that these trucks may have riding qualities that are equivalent to present day trucks with built-in damping devices.

This is accomplished by mounting a damping device, generally designated 19, within openings 20 cut from the vertical faces 21 of the bolster opening 13 so that friction may be applied to the sides of the bolster as it rises and falls within the bolster opening.

The damping device 19 comprises a housing 22 having a downwardly inclined, tubular extension 23 closed at its bottom end by a wall 24 having an opening 25 to receive a tension bolt 26. The housing 22 is preferably welded to the vertical web 27 of the truck side frame along weld lines indicated at 28 and 29.

The friction shoe 30 is mounted within the housing 22 and has downwardly inclined, arcuate, opposed wing projections 31 which pass through openings 32 in the housing 22, these openings flanking the tubular projection 23. A coil spring 33 has its upper end telescoped over the tubular projection 23 and abutting the wing projections 31, and the lower end of the spring is carried on an adjustable spring seat 34 held in place on the bolt 26 by a retaining nut 35. The head 36 of the tension bolt 26 has its underface seated upon the shoulder 37 formed by the bottom wall 24 of the tubular projection 23, so that when the retaining nut 35 is screwed to its desired position, the spring 33 acts in compression to exert an upward and inward force on the friction shoe 30 against the side of the truck bolster. A wear plate 38 is suitably welded as indicated at 39 to the side of the truck bolster for cooperation with the friction shoe 30.

Preferably the bolt 26 makes an angle of approximately 45° with the horizontal, and the inner face 40 of the housing 22 and top face 41 of the friction shoe 30 are beveled at a corresponding angle to form cooperating wedge faces.

The effect of the wedge faces 40 and 41 is to cause the damping device to be more effective on the up travel of the bolster than on the down travel thereof for the reason that when the bolster moves upwardly (Fig. 5), the frictional engagement between the shoe 30 and wear plate 38 drives the friction shoe tightly against the wedge face 40 and resists any tendency of the friction shoe 30 to move away from the bolster against the compression of the spring 33. Conversely, as the bolster moves downwardly, the frictional engagement between the shoe 30 and wear plate 38 tends to move the shoe away from the wedge face 40 so that the friction shoe 30 may readily move away from the bolster against the compression of the spring 33.

It will also be noted that the compression of the spring 33 always biases the friction shoe 30 against the wedge face 40 so that, as the bolster oscillates both vertically and to some extent horizontally within the bolster opening, there is no tendency for the friction shoe to slap against some other face of the housing to create undesirable noise and wear.

Although the bottom edge 42 of the friction shoe 30 is preferably beveled, there is sufficient clearance between this face of the friction shoe and the face 43 of the housing that the two faces do not normally contact during operation of the device.

Preferably the tubular extension 23 and wing projections 31 are provided with openings 44 and 45 respectively to receive a retaining pin indicated in dotted lines at 46 in Fig. 4 to hold the friction shoe in retracted position during mounting of the bolster within the bolster opening. The pin is also useful in holding the friction shoe retracted whenever the bolster is removed from the truck for any reason, and after the bolster has been replaced, the pin may be removed without necessitating readjustment of the spring compression. The openings 44 and 45 are placed in alignment for receiving the retaining pin by merely moving the bolster face against one vertical face 21 and then the other vertical face 21 of the bolster opening 13.

One advantage of the construction which has been described resides in the fact that the damping device extends not horizontally, but at an angle to the horizontal, so that sharp vertical loads applied to the unit as the truck runs along the track, subject the unit to less bending and shearing stresses and to more tensile stresses which the parts can more readily withstand.

Obviously, if it is desired to provide greater cushioning action for the down travel of the bolster, the damping unit could be inverted to achieve this result, i. e. the device may be inclined upwardly rather than downwardly within the window openings 14.

It is obvious that the device of this invention cushions lateral movement of the bolster as well as vertical movement, and also tends to maintain the truck side frames and bolster in proper alignment, which is of particular importance in the spring plankless type truck.

We claim:

1. A bolster damping device for application to a railway truck side frame having an opening for the end of a vertically movable bolster and having a hole formed in the wall defining said opening, said damping device comprising a rigid housing adapted to be secured to said side frame around said hole and providing an enclosure open to the hole and having an upwardly and inwardly inclined wedge surface in its upper portion, a generally cylindrical extension projecting outwardly from said housing at a downward inclination, a friction shoe within the housing enclosure having an inner vertical friction face adapted to extend through the hole in the side frame and an outer downwardly inclined wedge surface engaged with the inclined wedge surface of the housing, a pair of spaced outwardly and downwardly inclined wings of arcuate cross section formed on said shoe extending through openings in the housing and embracing the housing extension, a coil spring having its inner end portion mounted on the extension and having its inner end bearing against the outer ends of said wings, and adjustable tension means reacting between the extension and the outer end of the spring for compressing the spring to urge the vertical friction face of the shoe into frictional engagement with the side wall of a bolster in said side frame opening, with the inclination of the engaged wedge surfaces of the housing and shoe producing greater friction between the friction shoe and the bolster on upward movement of the bolster than on downward movement.

2. The combination claimed in claim 1, in which the housing extension and the friction shoe wings are provided with radial openings adapted to be aligned to receive a pin for holding the friction shoe in retracted position for assembly and application to the truck side frame.

3. A bolster damping device for application to a railway truck side frame having an opening for the end of a vertically movable bolster and having a hole formed in the wall defining said opening, said damping device comprising a rigid housing adapted to be secured in strengthening relation to said side frame at opposite sides of said hole and providing an enclosure open to the hole and having an upwardly and inwardly inclined wedge surface in its upper portion, a generally cylindrical extension having a seat therein and projecting outwardly from said housing at a downward inclination, a friction shoe comprising a block portion within the housing enclosure having an inner vertical friction face adapted to extend through the hole in the side frame and an outer downwardly inclined wedge surface engaged with the inclined wedge surface of the housing, said shoe including also a pair of spaced outwardly and downwardly inclined wing portions of arcuate cross sectional form extending through openings in the housing and embracing the housing extension, a coil spring having its inner end portion mounted on the extension and having its inner end bearing against the outer ends of said wing portions of the shoe and a bolt having its head seated in the extension, with its shank extending through the spring and provided with a nut and a spring seat for compressing the spring to urge the vertical friction face of the shoe into frictional engagement with the side wall of a bolster in said side frame opening, with the inclination of the engaged wedge surfaces of the housing and shoe producing greater friction between the friction shoe and the bolster on upward movement of the bolster than on downward movement.

References Cited in the file of this patent

UNITED STATES PATENTS

| | | |
|---|---|---|
| 1,452,529 | Scheibli | Apr. 24, 1923 |
| 1,834,944 | Gillespey | Dec. 8, 1931 |
| 2,053,989 | Goodwin | Sept. 8, 1936 |
| 2,346,614 | Rydin | Apr. 11, 1944 |
| 2,352,693 | Davidson | July 4, 1944 |
| 2,408,866 | Marquardt | Oct. 8, 1946 |